(12) United States Patent
Celia

(10) Patent No.: US 7,237,676 B2
(45) Date of Patent: Jul. 3, 2007

(54) DEMONSTRATION KIT FOR MARKETING A PRODUCT OR SYSTEM

(75) Inventor: Wayne Celia, Paramus, NJ (US)

(73) Assignee: H. H. Brown Shoe Technologies, Inc., Greenwich, CT (US)

( * ) Notice: Subject to any disclaimer, the term of this patent is extended or adjusted under 35 U.S.C. 154(b) by 882 days.

(21) Appl. No.: 10/378,523

(22) Filed: Mar. 3, 2003

(65) Prior Publication Data

US 2003/0139105 A1     Jul. 24, 2003

Related U.S. Application Data

(63) Continuation-in-part of application No. 09/691,455, filed on Oct. 18, 2000, now abandoned.

(51) Int. Cl.
    *B65D 69/00*     (2006.01)
    *B65D 33/04*     (2006.01)

(52) U.S. Cl. .............. 206/569; 206/223; 206/459.1; 206/459.5; 383/42; 383/106

(58) Field of Classification Search ............. 206/223, 206/569, 459.1, 459.5; 383/42, 106
    See application file for complete search history.

(56) References Cited

U.S. PATENT DOCUMENTS

| | | | |
|---|---|---|---|
| 4,804,984 A | | 2/1989 | Heuer et al. |
| 5,390,796 A | * | 2/1995 | Kerfoot, Jr. .................. 206/534 |
| 5,803,498 A | * | 9/1998 | Tung et al. .................... 283/56 |
| 6,328,158 B1 | * | 12/2001 | Bisbal et al. ................ 206/223 |
| 2001/0054569 A1 | | 12/2001 | Bishal et al. |

* cited by examiner

*Primary Examiner*—Glenn Caldarola
*Assistant Examiner*—John Douglas
(74) *Attorney, Agent, or Firm*—St. Onge Steward Johnston & Reens LLC

(57) ABSTRACT

A sized demonstration kit distributable or mailable to customers for marketing purposes is illustrated with reference to a moisture control material and system for wicking away and dissipating body moisture. The kit has a relatively small holder in the shape of a container or foldable device having, an exterior surface for at least a printed address and postage, an interior surface defining a storage space, with access to the storage space. Optionally the holder is transparent or with a viewing window. Samples of the moisture control material and associated items for testing purposes are removably offered to the interior surface of, a first space for printed information on the nature and operation of the moisture control material and system, and a second space for printed instructions on how to test at least one of the samples of the moisture control material are disposed in the holder.

17 Claims, 3 Drawing Sheets

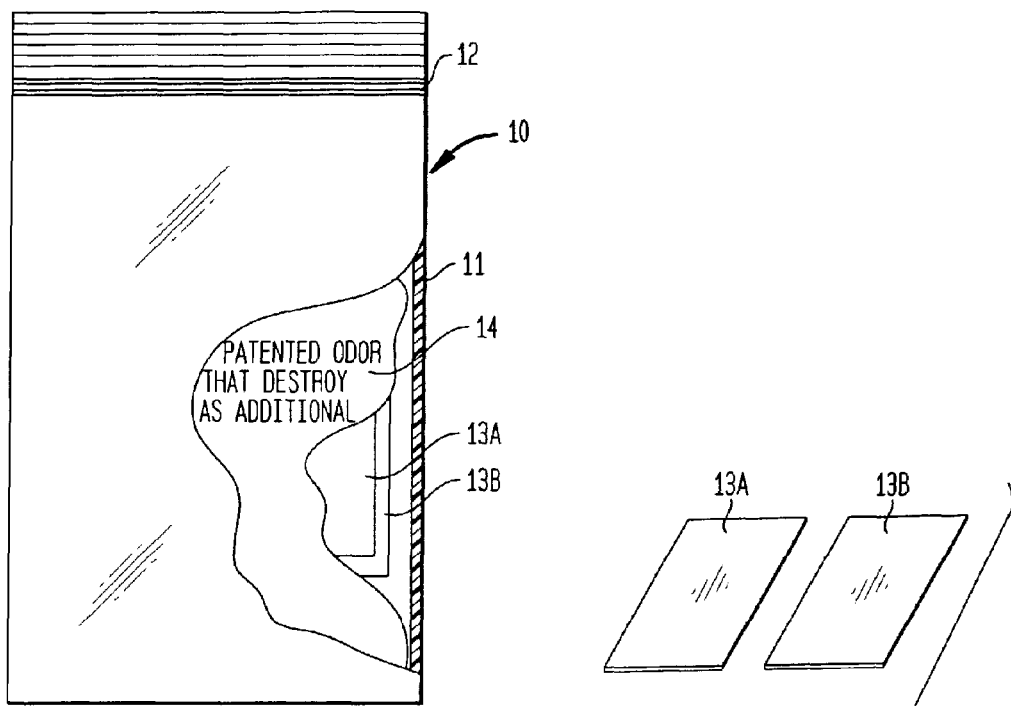
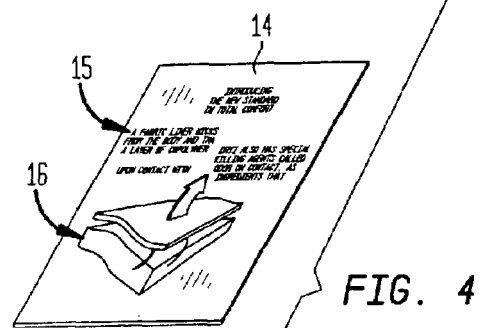
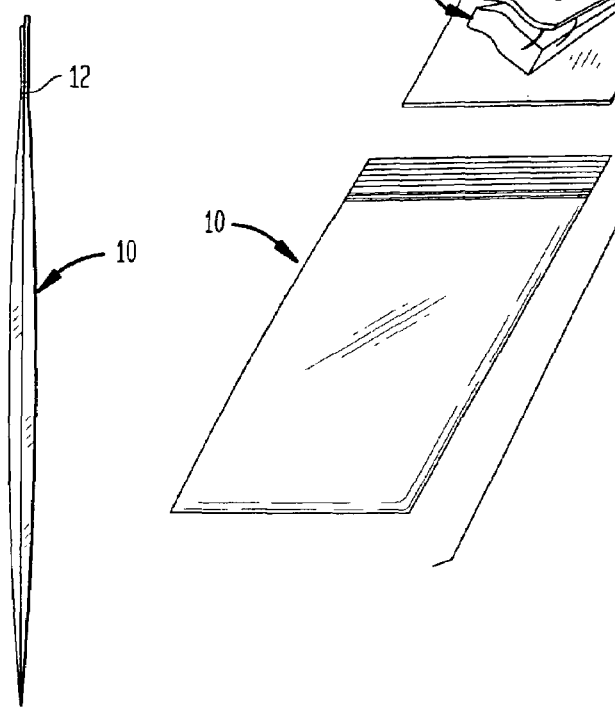

DEMONSTRATION KIT FOR MARKETING A PRODUCT OR SYSTEM

CROSS REFERENCE TO RELATED APPLICATIONS

This application is a continuation in part of U.S. application Ser. No. 09/691,455 filed Oct. 18, 2000 now abandoned.

BACKGROUND OF THE INVENTION

The present invention relates to marketing and selling devices, methods and techniques and, more particularly, to a simple sized demonstration kit with samples of the product and instructions, distributable to potential customers at tradeshows, sales meetings, by mail, through media advertisements and other marketing techniques to enable customers to understand the application, operation and advantages of the particular product or system.

In the competitive marketplace, there are many marketing techniques, direct communication to assess the customers' needs and uses for the product being sold, mail communication with printed information on the products or systems being offered, point-of-sale advertisements and demonstrations at trade shows or special marketing events in the given industry which utilize the given product or system.

The present invention relates to a demonstration kit of limited size and shape which includes samples of the products; instructions on how to use the samples to show the function and operation of the product and use in any associated system; advertisement information to describe the uses, application and advantages of the product available for demonstration and test by the potential customer; and a container, either of a clear material such as a plastic bag into which the elements and material of the demonstration kit can be packed or in a foldable, paper, cardboard or plastic device or holder on which the demonstration samples and associated element can be affixed for distribution at trade shows, sales meetings and point of sales of the products and which can be adapted for mailing to potential customers or users of the products and system.

The present invention will be described with particular reference to these demonstration kits for the marketing and sale of a product or material manufactured by Dicon Technologies of Fair Lawn, N.J., and sold in the commercial marketplace under the trademark "DRYZ" and the system utilizing such product for moisture management by wicking away and dissipating body moisture in, for example, footwear, body braces, orthotic devices and other products closely associated with and in contact with the human body and parts thereof, as shown and described in U.S. Pat. Nos. 5,763,335 and 6,025,287. However, those skilled in the art will recognize that this is only for purposes of illustration and that the demonstration kits in accordance with the present invention has uses for the promotion and advertising of products and systems other than those as shown and described in the above-identified patents.

SUMMARY OF THE INVENTION

Accordingly, as one aspect of the present invention, demonstration kits for a moisture control management product, material and system for wicking away and dissipating body moisture have a relatively small and sized container or foldable holder with an exterior surface, and an interior surface defining a storage space, samples of the moisture control material for test purposes, a first space for printed information on the nature and operation of the moisture control material and system, a second space for printed instructions on how to use and test the samples of the moisture control material to demonstrate the operation of the moisture control system are all disposed in the storage space of the demonstration kit, and alternatively and selectively the container or foldable holder can be transparent or have a window section to enable the contents of the storage space to be visible.

It is another aspect of the present invention to provide a simple sized demonstration kit for a moisture control management material and system for wicking away and dissipating body moisture for distribution or mailing to potential customers.

It is another aspect of the present invention to provide an improved marketing device in the form of a demonstration kit for a material and system for wicking away and dissipating body moisture adapted for easy distribution to potential customers, manually and by pick-up at trade shows or sales meetings, by regular or special mail services and by courier or other delivery service and techniques.

It is another aspect of the present invention to provide a demonstration kit for moisture control products and materials and system for wicking away and dissipating body moisture has a foldable holder made of a paper, cardboard or plastic material having an exterior surface for receiving an address and postage and other indicia, an interior surface defining a storage space for at least one sample of the moisture management material and associated elements for test purposes, a first space on the interior surface for printed information on the nature and operation of the moisture management system, a second space for printed instructions on how to use and test the samples of the moisture management material to demonstrate the system.

It is still another aspect of the present invention to provide an improved marketing device in the form of a relative small and sized demonstration kit having a foldable holder made of paper, cardboard plastic and the like materials adapted for affixing samples of material and associated elements for test purposes with instructions for the test to demonstrate materials or systems for various objects and purposes such as a system for moisture management by wicking away and dissipating body moisture, particularly adapted for mailing by regular mail.

It is a still further aspect of the present invention to provide an improved marketing device in the form of a relative small and sized demonstration kit having a foldable holder made of paper, cardboard plastic and the like materials adapted for affixing samples of material and associated elements for test purposes with instructions for the test to demonstrated materials or systems for various objects and purposes such as a material and system for moisture management by wicking away and dissipating body moisture which is portable can be easily fitted into the pocket of a jacket or coat of a potential or interest customer or user of the product, material or system.

With these and other objects and advantages, the present invention will be described with references to the following drawings.

BRIEF DESCRIPTION OF THE DRAWINGS

FIG. 1 is a front view of a demonstration kit in accordance with the present invention partly broken away to show the demonstration items in the demonstration kit.

FIG. 2 is a top view of the demonstration kit shown in FIG. 1.

FIG. 3 is a side view of the demonstration kit shown in FIG. 1.

FIG. 4 is an exploded view showing the container and the contents of the container for the demonstration kit shown in FIG. 1 of the drawings.

DETAILED DESCRIPTION

Figure 5:
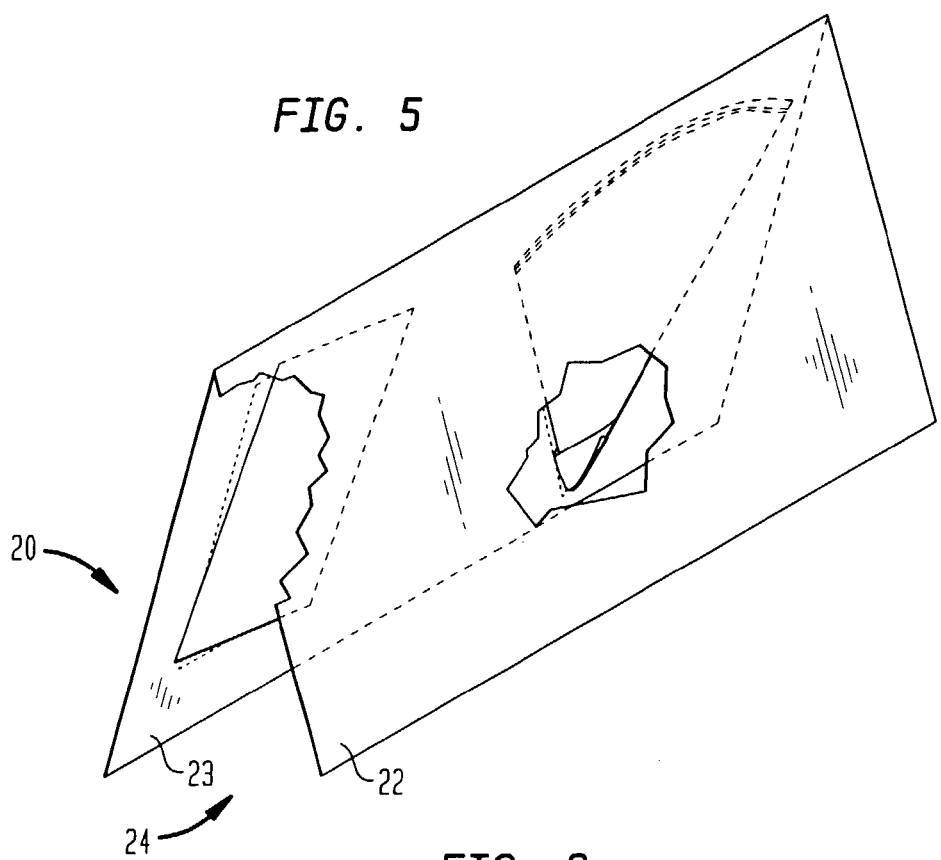
FIG. 5 is a perspective view of a foldable demonstration kit in accordance with the present invention made of paper, cardboard or plastic partly broken away in vertical section to show the demonstration samples and associated items for the test affixed on the inner surface in the storage space formed by the demonstration kit.

U.S. Pat. No. 5,763,335 discloses and claims an open cell hydrophilic urethane material which, among other uses and applications, is particularly adapted for moisture management, odor control, insulator linings and many other purposes. It is sold in the commercial marketplace under the "DRYZ" trademark for footwear, activewear, outerwear, sportswear, sporting equipment, gloves and braces for sports injuries and medical ailments.

In marketing this material and system for moisture management control, one demonstration kit generally designated 10 in accordance with the present invention and shown in FIGS. 1 to 4 of the drawings has been developed to assist the marketing personnel in showing how this patented material and system operates to achieve the beneficial advantages and results, as set forth in Pats. '335 and '287.

Thus, by reference to FIGS. 1 to 4, the demonstration kit 10 is shown as having the contents of the kit, as hereinafter described, housed in a relatively small and sized self-sealable container or bag 11. Container 11 can be made of any type of suitable material such as a plastic and defines a storage space and will have an opening 12 at one end in communication with the storage space which can be opened and resealed, such as the plastic sandwich-type bags sold on the open market under the trademark "GLAD." It is preferably a clear plastic bag so that the contents of the material inside the bag can be clearly seen. While a clear plastic bag is preferred, those skilled in the art will recognize that the container 11 can be made of other materials or be colored or opaque, provided some type of viewing window, not shown, is provided to reveal the nature of the contents in the container without departing from the scope of the present invention.

Disposed in the storage space of the container 11 are several sample pieces 13a and 13b of the "DRYZ" material to be used for test purposes for demonstrating the moisture management system in accordance with Pats. '335 and '287. The sample pieces may, of course, have any desired size and shape, but for a simple demonstration kit, they are shown as generally rectangular in shape and approximately 2"×3". This size and shape can be easily modified; thus, the sample pieces can be 1" by 2" and oval in shape or 3"×4" and square in shape. The size in part will, of necessity, be a function of the dimensions of the container 11 which is selected for the demonstration kit 10.

Operatively connected with the sample pieces 13a and 13b is a card insert 14 having printed information regarding the material at a first space 15 and printed instructions and directions at a second space 16 which serves several purposes.

The printed information in space 15 provides means for describing the nature of the moisture management system. The printed information in the second space 16 provides the steps necessary for conducting the tests with the test samples provided in the demonstration kit; in addition, the instructions specify any safety warnings and precautions needed so the tests can be properly conducted; and last, it instructs the user regarding disposal of the used test samples. While the spaces 15 and 16 are illustrated on the same side of the insert card 14, those skilled in the art will readily recognize that the description, applications, etc. can be on one side of the insert card 14 and the test instructions and warnings on the opposite side of insert card 14 without departing from the scope of the present invention.

The test demonstration kit can also be imprinted with additional information and advertising on the outside of the container and, because it is relatively small, can be easily enclosed in mailing information or left in small piles to be picked up by potential customers at trade shows, other marketing functions, or at points of sale for these products.

Figure 6:
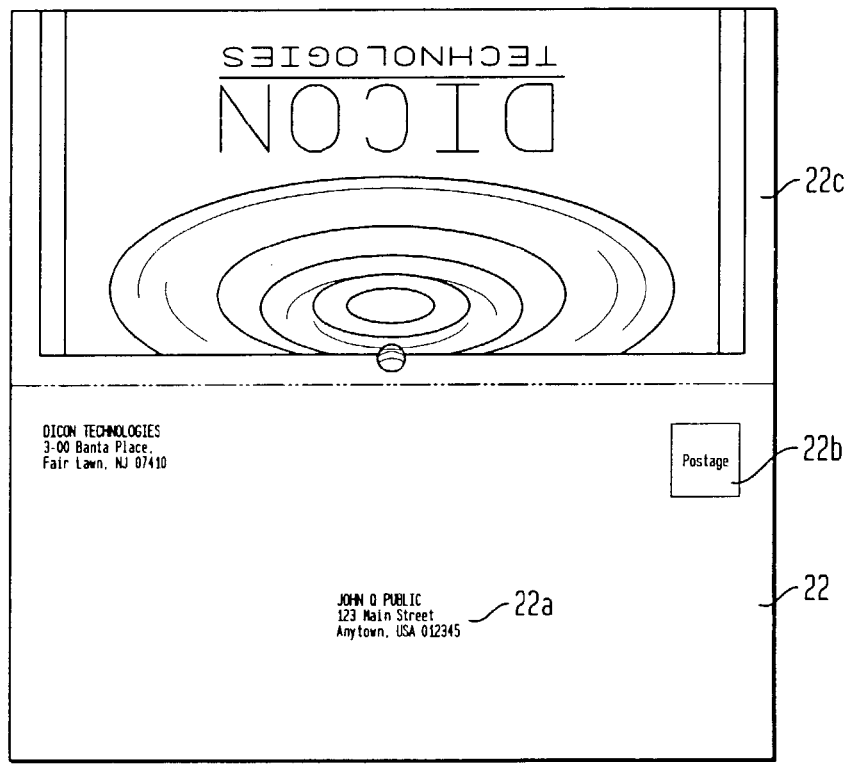
FIG. 6 is a plan view of the exterior surface of the foldable demonstration kit shown in FIG. 5 showing the place for an address of the potential customer, for postage and other advertising indicia.
Figure 7:
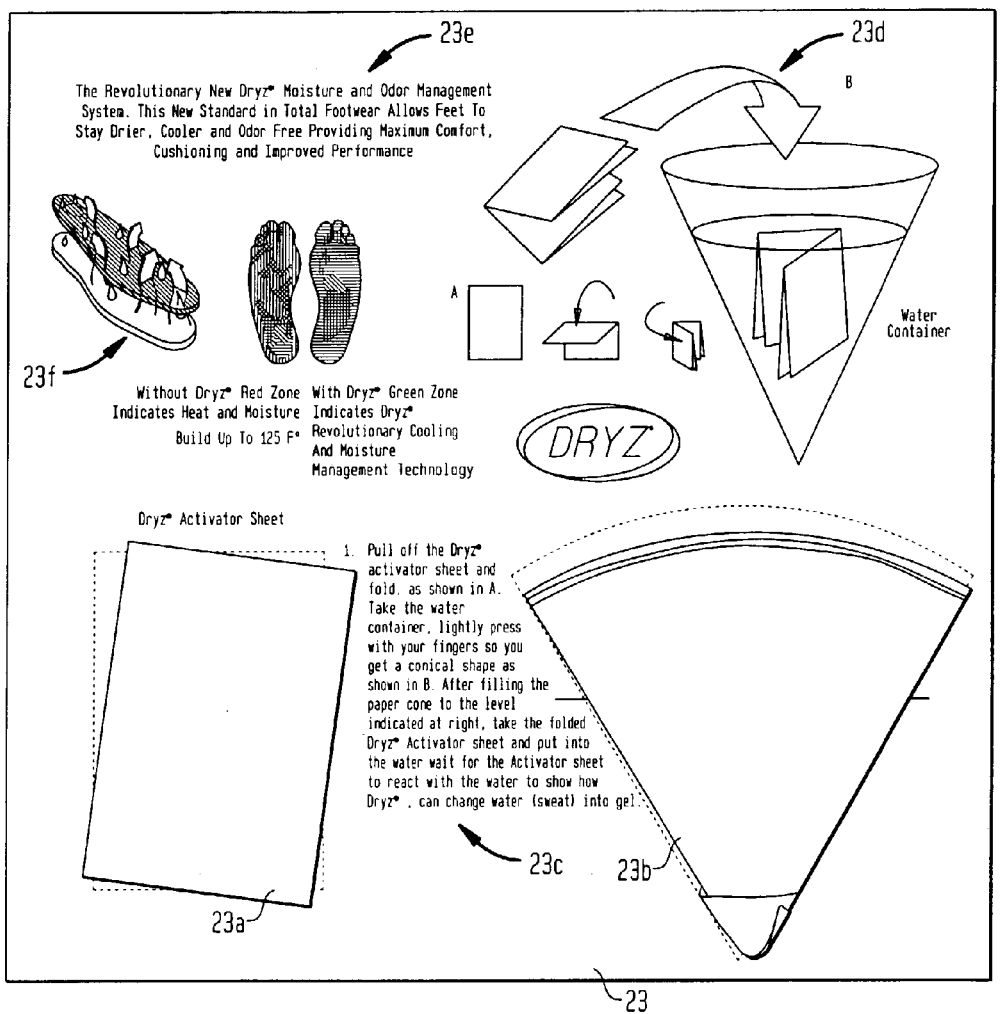
FIG. 7 is a plan view of the interior surface and storage space for the demonstration kit shown in FIG. 5 showing the demonstration samples and associated items for the test together the printed information on the moisture management system and instructions for conducting the test to demonstrate the system.

In another embodiment of the invention as shown at FIGS. 5, 6 and 7 of the drawings, a demonstration kit generally designated 20 in accordance with the present invention is illustrated which not only can be distributed at trade shows and sales meetings where the moisture management system and products are being discussed and promoted but in addition is in a form that the be readily mailed to potential customers interested in the moisture management system and the associated products for use therein.

Thus FIG. 5 shows that in this embodiment instead of using a clear plastic bag for holding the instruction and promotional materials and sample products and instructions for test purposes the demonstration kit has a holder 21 made or formed from a sized and shaped sheet of heavy paper, thin cardboard, a plastic sheet and the like type of materials to provide an exterior surface 22 and an interior surface 23.

By reason of the nature of the sheet material from which the demonstration kit 20 is made it can be easily folded on itself to reduce the size of or the space occupied by the demonstration kit so that multiple demonstration kits can be easily carried, stacked or placed out for easy access when distributed at trade shows or sales meetings. The size and shape of the demonstration kits in accordance with the embodiments of the present invention as disclosed is that they are sized and shaped to fit easily into the pocket of a potential customer or user when picked-up or received at a trade show or other sales meeting or received by mail. In this regard the demonstration kit shown at FIGS. 5, 6 and 7 of the drawings can be sealed about the edges so it can be mailed or otherwise distributed. When it is folded on itself and the edges sealed one portion 22a of the exterior surface 22 can be used to address the demonstration kit to the customer desiring information or to a potential customer and suitable postage applied as at 22b so the addressed demonstration kit can be mailed either regular mail or by the various types of special mail delivery. While not specifically illustrated, those skilled in the art will readily recognize that a portion as at 22c can also be used to advertise the originator of and/or the product which is the subject matter of the demonstration kit 20.

Referring to FIGS. 5 and 7, the demonstration kit 20 in accordance with this embodiment of the invention shows that the interior surface 23 has samples of the product or material as at 23 affixed to one section of the interior surface 22, at another section of the interior surface spaced therefrom is affixed and associated item or device as at 23b needed and used for the test demonstration and between the demonstration samples 23a and the associated test items or device 23b are printed instructions and figures as at 23c and 23d describing how to make the test to demonstrate and illustrate the purpose and object of the system such as the moisture management control system which has been used to illustrate the present invention. Further, at still another portion or section of the interior surface printed information 23e and pictures 23f are shown for describing the moisture management system to illustrate and disclose to the potential customer or user of the materials or system for which the demonstration kit is being directed or used.

It is thought clear from FIGS. 5 and 7 that when the demonstration kit 20 of this embodiment is folded on itself, it defines a storage space 24 which serves to hold the demonstration samples 22a and their associated test items or devices 22b intact an in position on the interior surface 22 of the demonstration kit until the potential customer or user elects to conduct the test in accordance with the instructions 22c and figures 22d as printed and shown on the selected portions of the interior surface 22 of the demonstration kit 20.

Thus, a relatively simple, low-cost, easily distributable marketing tool has been described herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A generally sized and shaped distributable and mailable demonstration kit for a moisture control material and system for wicking away and dissipating body fluids and moisture comprising:
   a. a relatively small holder made of a sheet of material having, an exterior surface and an interior surface which can be folded on itself to define a storage space when in the folded position,
   b. at least one sized sample of moisture control material for self testing purposes detachably connected to the interior surface of the holder
   c. a collapsible fluid tight container detachably connected to the interior surface of the holder, and
   d. a first space for printed information on the interior surface of the holder on the nature of the material and system for dissipating body fluids and moisture and a second space for printed instructions on detaching the sample materials and fluid tight container and conducting the test demonstration for showing the operation of the moisture control system for wicking away and dissipating body fluids and moisture.

2. The demonstration kit as in claim 1 wherein the holder material is from the group of paper, cardboard and plastic material.

3. The demonstration kit as in claim 1 or 2 wherein the exterior surface of the holder is adapted to receive indicia for identifying the recipient of the demonstration kit and where necessary postage for the mailing of the demonstration kit.

4. The demonstration kit as in claim 1 or 2 wherein when the holder is folded, a portion of the exterior surface of the demonstration kit is adapted to receive indicia for identifying the recipient of the demonstration kit, a portion has a place for postage for mailing the demonstration kit, and a portion for advertising the nature, purpose and origin of the materials and system disclosed by the demonstration kit.

5. In the demonstration kit as in claim 1 wherein at least one associated test item is also affixed to the interior surface of the holder generally a spaced distance from the at least one sample of the moisture control material.

6. In the demonstration kit as in claim 1 wherein: a. an insert is provided in said holder, b. said first space and the printed information is provided on said insert, and c. said second space and the printed information is provided on said insert a spaced distance from said first space.

7. In the demonstration kit as in claim 1 wherein each of the samples of the moisture control material has a predetermined shape and size.

8. In the demonstration kit as in claim 1 wherein each of the samples of the moisture control material is randomly shaped and in a range up to approximately six (6) square inches.

9. In the demonstration kit as in claim 1 wherein each of the samples of the moisture control material is rectangular in shape and each is approximately six (6) square inches.

10. In the demonstration kit as in claim 6 wherein each of the samples of the moisture control material has a predetermined shape and size.

11. In the demonstration kit as in claim 6 wherein each of the samples of the moisture control material is randomly shaped and in a range up to approximately six (6) square inches.

12. In the demonstration kit as in claim 6 wherein each of the samples of the moisture control material is rectangular in shape and each is approximately six (6) square inches.

13. In the demonstration kit as in claim 6 wherein the first space for printed information is on the front of the insert, and the second space for printed instructions is on the rear of the insert.

14. In the demonstration kit as in claim 1 wherein the holder is a container made of clear plastic, and said container having at least one opening in communication with the storage space.

15. In the demonstration kit as in claim 1 wherein the holder is a container, said container has at least one resealable opening in communication with said storage space, and means on said container for viewing the contents in the storage space of the container.

16. In the demonstration kit as in claim 1 wherein the holder is a container made of a plastic material, said container has a resealable opening in combination with the storage space, said container has means thereon for viewing the contents of the container, and said exterior surface of the container is imprinted with information such as addresses and advertising.

17. In the demonstration kit as in claim 1 wherein the holder is a foldable sheet from the group of paper, cardboard and plastic materials, and said storage space is formed by the interior surface when the holder is folded.

* * * * *